United States Patent
Chakra et al.

(10) Patent No.: US 7,890,803 B2
(45) Date of Patent: Feb. 15, 2011

(54) CONSTRAINT PROGRAMMING FOR REDUCTION OF SYSTEM TEST-CONFIGURATION-MATRIX COMPLEXITY

(75) Inventors: Al Chakra, Cary, NC (US); David M. Ogle, Cary, NC (US); Patrick J. O'Sullivan, Dublin (IE); Clay E. Williams, New York, NY (US); Cemal Yilmaz, West Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/819,786

(22) Filed: Jun. 21, 2010

(65) Prior Publication Data

US 2010/0257406 A1    Oct. 7, 2010

Related U.S. Application Data

(63) Continuation of application No. 11/697,782, filed on Apr. 9, 2007, now Pat. No. 7,805,635.

(51) Int. Cl.
  *G06F 11/00*    (2006.01)
(52) U.S. Cl. ....................................................... 714/26
(58) Field of Classification Search ............. 714/25–28, 714/32–34, 37–39, 45–47
See application file for complete search history.

(56) References Cited

U.S. PATENT DOCUMENTS

| | | | |
|---|---|---|---|
| 4,591,983 A | 5/1986 | Bennett et al. | |
| 5,421,004 A | 5/1995 | Carpenter et al. | |
| 5,515,524 A | 5/1996 | Lynch et al. | |
| 5,542,043 A | 7/1996 | Cohen et al. | |
| 5,634,098 A | 5/1997 | Janniro et al. | |
| 5,822,565 A | 10/1998 | DeRosa, Jr. et al. | |
| 5,832,503 A * | 11/1998 | Malik et al. | 709/223 |
| 5,892,947 A * | 4/1999 | DeLong et al. | 717/100 |
| 6,401,220 B1 * | 6/2002 | Grey et al. | 714/33 |

(Continued)

OTHER PUBLICATIONS

"TOFU: Test Optimizer for Functional Usage", Software Engineering Technical Brief—No. 4; published by Center for Software Engineering, IBM T.J. Watson Research Center.

(Continued)

*Primary Examiner*—Nadeem Iqbal
(74) *Attorney, Agent, or Firm*—Jon A. Gibbons; Fleit Gibbons Gutman Bongini & Bianco PL

(57) ABSTRACT

A system for creating a system configuration data set includes an input operable to receive a set of system properties with attributes and values and a set of expressions representing a set of system test goals. The system further includes a processor operable to define a hierarchical tree structure with a plurality of nodes where each node represents one of the system properties and includes at least one of the attributes and the values and an output operable to output a set of system test data utilizing the hierarchical tree structure combined with the expressions. A method includes creating a hierarchical tree structure with a plurality of nodes where each node represents a system property. The method further includes receiving a set of expressions representing a set of system test goals and creating a set of system test data utilizing the hierarchical tree structure combined with the expressions.

8 Claims, 6 Drawing Sheets

U.S. PATENT DOCUMENTS

| | | | |
|---|---|---|---|
| 6,577,982 B1 * | 6/2003 | Erb | 702/120 |
| 6,601,018 B1 | 7/2003 | Logan | |
| 6,859,893 B2 * | 2/2005 | Hines | 714/38 |
| 6,928,393 B2 | 8/2005 | Czerwonka | |
| 6,937,965 B1 * | 8/2005 | Bilak et al. | 703/2 |
| 7,373,621 B1 | 5/2008 | Dastidar | 716/4 |
| 7,805,635 B2 * | 9/2010 | Chakra et al. | 714/26 |
| 2004/0123272 A1 * | 6/2004 | Bailey et al. | 717/125 |
| 2006/0010426 A1 * | 1/2006 | Lewis et al. | 717/124 |
| 2006/0101406 A1 * | 5/2006 | Goenka et al. | 717/124 |

OTHER PUBLICATIONS

Cohen, David, et al., "The AETG System: An Approach to Testing Based on Combinatorial Design"; IEEE Transactions on Software Engineering, vol. 23, No. 7, Jul. 1997, pp. 437-444.

Biyani, R., et al., "TOFU: Test Optimizer for Functional Usage", Software Engineering Technical Brief, 2(1), 1997, IBM T.J. Watson Research Center.

* cited by examiner

| Server: | Client: | WAS Version: | Databases: | LDAP Directory: | HTTP Server: |
|---|---|---|---|---|---|
| Note: "Power" below means Power 4, Power 5, Open Power, and Power Blades.<br><br>-Win XP SP1, SP2-development<br>-Win 2000 Server SP4 and Advanced Server SP4<br>-Win 2003 Standard and Enterprise SP2<br>-Red Hat Enterprise Linux ES, AS, WS, Desktop for (x86) 3.0 U4 (WS & Desktop are only supported as developer platforms)<br>-Red Hat Enterprise Linux ES, AS, WS, Desktop for (x86) 4.0 U2 (WS & Desktop are only supported as developer platforms)<br>-Red Hat Enterprise Linux AS for (Power) 3.0 U4<br>-Red Hat Enterprise Linux AS for (Power) 4.0 U2<br>-Red Hat Enterprise Linux AS for (zSeries) 3.0 U4<br>-Red Hat Enterprise Linux AS for (Power) 4.0 U2<br>-SuSE, SuSE SLES 9, 2.6 kennel (x86) SP2 (SuSE is only supported as a developer platform)<br>-SuSE SLES 9, 2.6 kennel (Power) SP2<br>-SuSE SLES 9, 2.6 kennel (zSeries) SP2<br>-AIX 5.2 ML06<br>-AIX 5.3 ML03<br>-Solaris 9 with the recommended Patch Chapter of June 2005<br>-Solaris 10<br>-HP-UX-V11iV1, V11iV2 (V11iV2 requires a proper connection for V11iV2 support based on V11iV1 testing)<br>-iSeries-iSlOS-V5R3, V5R4 (V5R4 won't GA until February 06)<br>-z/OS-V1.6, V1.7 (z/OS 1.7 with GA SV05, Websphere Process Server won't support zIOS until 2H2008) | Client Eclipse Based -3.1<br><br>Client-Browser OS (See below for specific browser versions):<br>-Win 2K Professional SP4<br>-WinXP Professional SP2<br>-Windows Vista (planned RTM is July 25th, 2006)<br>-SuSE Linux Desktop (SLD) v9.0 (Gnome Desktop only)<br>-SuSE Linux Desktop (SLD) v10.0 (May 06) Supported desktop only<br>-Red Hat Enterprise Linux WS v3.0 (Update Desktop only)<br>-Red Hat Enterprise Linux WS v4.0 Update 2 (Gnome Desktop only)<br>-Red Flag v4.1 (Gnome Desktop only)<br>-Mac OSX 10.4.3 "Tiger"<br>Client-Browsers:<br>-IE6.0 browser on WinXP SP2 using JRE Sum 1.5 or MS JVM 1.1<br>-IE 6.0 browser on Win 2K SP4 using JRE Sum 1.6 or MS JVM 1.1 | WAS:<br>-V6.0.2 Base<br>-V6.0.2 Network Deployment (ND)<br>-WebSphere Process Server V6.0.1- Business Process Choreographer component<br>-WebSphere Process server V6.0.1<br><br>The base Portal installer will lay down WAS Base, WAS ND, and the BPC component from WebSphere Process Server. We will also support specifying an existing WebSphere Process Server to use during installation.<br><br>Either BPC or WebSphere Process Server (WPS) will always need to be present. | Server Database<br>-Cloudscape 5.1.60.28<br>-DB2 Enterprise Server Edition V8.1FP11<br>-DB2 Enterprise Server Edition V8.2 FP4<br>-DB2 Workgroup Server Edition V8.1 FP11<br>-DB2 Workgroup Server Edition v8.2 FP4 (8.2.4–8.1.11)<br>-DB2 Enterprise Server Edition V8.1<br>-DB2 Workgroup Server Edition V8.1<br>-DB2 Express Server Edition V8.1<br>-Oracle 9i EE R2 9.2.0.5. 9.2.0.6<br>-Oracle 10.1.0.3<br>-Oracle 10.2.0.1.0 10g<br>-MS SQL Server Enterprise 2000 SP4<br>-MS SQL Server Enterprise 2006<br>-D82 for iSeries: V5R3. V5R4<br>-DB2 for zSeries: 7.1.8.1<br><br>Server Database Clustering<br>-Oracle clustering via SAC<br>-DB2 clustering via HACMP | LDAP Directory versions<br>-ITDS V5.2.6.0<br>-Domino 6.5.5. Domino 7. 7.0.1<br>-MS Active Directory 2000<br>-MS Active Directory (Application Mode) 2000<br>-MS Active Directory 2003<br>-MS Active Directory (Application Mode) 2003<br>-Sun Java System Directory Server 5.2 (previously known as: Sun ONE Directory 5.2)<br>-Novell eDirectory V8.7.3.7<br>-ITDS-iSeries (with OS400 V5R3 and V5R4)<br>-IBM zOS Security Server 1.6.1.7 | -Apache Server 2.0.5.2 2.0.5 support WAS<br>-IBM HTTP S 2.0.47.1<br>-IBM HTTP S 6.0.2 6.0.2<br>-IBM HTTP S iSeries (Power Apache) VS on Apache 2<br>-IBM HTTP S zOS (Ships and zIOS) MS11S 5.0 of 2000<br>-MS 11S 6.0 of 2003<br>-Sun Java System Server 6.0 S (previously Sun ONE Win Enterprise E SPS. 6.1 SP<br>-Domino Enterprise Server (as W 6.5.4. 6.5.5. |

FIG. 1

```xml
<?xml version="1.0" encoding="windows-1252" standalone="yes"?>
<!-- Generated by ABC Amber Lotus 1-2-3 Converter v2.10 Unregistered -->
-<Rows>
 -<Row>
   <Columns A="Terms used in this config plan" />
  </Row>
 -<Row>
   <Columns B="Column" D="Explanation" />
  </Row>
 -<Row>
   <Columns B="#Servers" D="Denotes the amount of H/W required"/>
  </Row>
 -<Row>
   <Columns B="PTY" D="Denotes relative priority - SVT goal is that all P1
      configs will be addressed pre EGA" />
  </Row>
 -<Row>
   <Columns B="CFG" D="Denotes the unique Config Number - this is the
      unique index used to relate a test case in the TCDB with the associated
      configuration in the config plan for execution" />
  </Row>
 -<Row>
   <Columns B="App Server Platform" D="Denotes the application server
      platform" />
  </Row>
 -<Row>
   <Columns B="Portal Tier" D="Portal Application Server Tier Including
      Documents, WCM, Designer, TS" />
  </Row>
 -<Row>
   <Columns B="Learning Tier" D="Learning Tier" />
  </Row>
 -<Row>
   <Columns B="MSG. Tier" D="Messaging Tier" />
  </Row>
 -<Row>
   <Columns B="RT. Tier" D="Real Time Tier" />
  </Row>
 -<Row>
```

FIG. 2 ent and claims priority from

CONSTRAINT PROGRAMMING FOR REDUCTION OF SYSTEM TEST-CONFIGURATION-MATRIX COMPLEXITY

CROSS REFERENCE TO RELATED APPLICATIONS

This application is based upon and claims priority from prior U.S. patent application Ser. No. 11/697,782, filed Apr. 9, 2007, now U.S. Patent No. [allowed] the disclosure of which is hereby incorporated by reference in its entirety.

FIELD OF THE INVENTION

The present invention relates generally to testing, and, in particular, to automatically generating a best-effort minimal set of system test configurations for highly-configurable systems.

BACKGROUND OF THE INVENTION

Function Test teams are tasked with the validation of a set of features and functions in a system or application. This validation is a comprehensive exercise that demonstrates quality at a feature/functional level in accordance with specifications and requirements placed on the system. Specifically, system testing is used to assess the overall quality of the code from the perspective of the customer.

Testing, such as unit testing, integration testing, system testing, conformance testing, and others is conducted on a complete integrated system to evaluate the entire system's compliance with its specified requirements. This type of testing therefore evaluates the interactions of the various functions in the environment specified in the requirements. System testing is conducted in an environment that attempts to model as realistically as possible scenarios of customer usage. These scenarios are largely based on the quantitative knowledge of domain experts within the test team, as well as continuously gathered information from reported customer experiences with the product.

Function and System Testing is performed on systems that exhibit functional and nonfunctional decisions. For example, consider the table 100 shown in FIG. 1. Table 100 describes examples of supported nonfunctional requirements for Lotus Workplace 3.0 system. The permutations and combinations of systems that can be built around this list are almost endless. Therefore, decisions need to be made prior to testing as to the number of configurations that will be tested (for schedule and resource reasons) whilst at the same time providing as broad a coverage as possible. This determination typically results in some kind of configuration matrix that captures the systems that test teams build and that includes the heterogeneity required to cover a set of nonfunctional attributes.

Typically, configuration plans are built manually and coordinated by a single person. FIG. 2 is an example of a configuration matrix 200 created manually using Lotus. The effort requires multiple passes with many subject matter contributors contributing their own coverage requirements. Once aggregated in a central place, a series of systematic pass-throughs is performed (manually) to change decisions made at various points with a view to ensuring as much heterogeneity and coverage in the decisions made.

This method is time consuming, expensive, tedious, imperfect, and prone to errors. Therefore a need exists to overcome the problems with the prior art as discussed above.

SUMMARY OF THE INVENTION

The invention, according to an embodiment, includes a method of creating a system configuration data set, where the method comprises creating a hierarchical tree structure with a plurality of nodes where each node represents a system property and includes at least one of an attribute and a value. The method further comprises receiving a set of expressions representing a set of system test goals and creating a set of system test data utilizing the hierarchical tree structure combined with the expressions.

According to an additional feature of the present invention, the expressions are first-order logic expressions that define conditional and quantified goals of a system.

According to yet another feature, the present invention includes selecting at least one of the attribute, the value, and the expression so as to further define at least one of the set of system test goals.

According to still another feature of the present invention, the set of expressions includes at least one preference expression that defines at least one of testing knowledge, testing experience, and testing beliefs.

According to a further feature, embodiments of the present invention include associating a bias value to the at least one preference expression and associating a priority value to the at least one preference expression.

The present invention, according to one embodiment, includes a system for performing event analysis, where the system comprises an input operable to receive a set of system properties with attributes and values and a set of expressions representing a set of system test goals. The system also includes a processor operable to define a hierarchical tree structure with a plurality of nodes where each node represents one of the system properties and includes at least one of the attributes and the values and an output operable to output a set of system test data utilizing the hierarchical tree structure combined with the expressions.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is an exemplary table of supported nonfunctional requirements.

FIG. 2 is an exemplary manually created configuration matrix.

DETAILED DESCRIPTION

Figure 3:
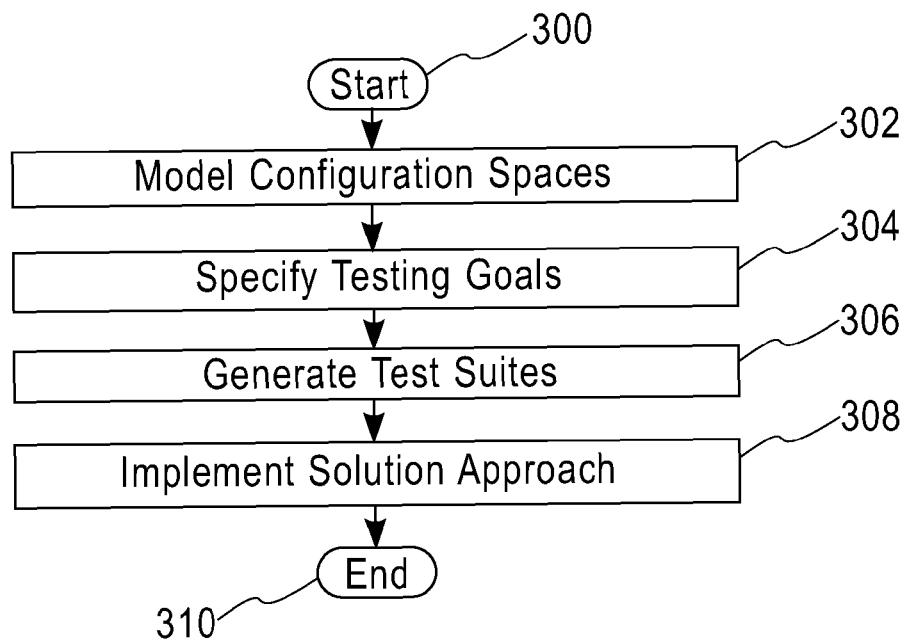
FIG. 3 illustrates a system test configuration process in accordance to an embodiment of the present invention.

While the specification concludes with claims defining the features of the invention that are regarded as novel, it is believed that the invention will be better understood from a consideration of the following description in conjunction with the drawing figures, in which like reference numerals are carried forward.

Described now is an exemplary method and hardware platform for automatically generating a minimal set of test configurations for highly-configurable systems (e.g., operating systems, databases, and middlewares), which meet predefined testing goals. It should be noted that the invention described herein follows a best-effort approach to compute a "minimal" set of system test configurations. It does NOT guarantee that the minimum set is always computed. Therefore, the term "minimal" is used throughout to description to represent a best-effort approach to finding a minimum-numbered set. The invention is not to be limited to an actual mathematical minimum. Highly-configurable systems have options and settings. However, it is usually the case that not all configurations are valid, i.e. there are constraints on what option and setting configurations will work. For instance, MS Internet Explorer does not work on Linux. In addition, the components themselves have options and settings. For example, the amount of free memory, the size of a cache, and others, which can render components non-compatible.

As an improvement over the state of the art techniques, an embodiment of the present invention allows testing goals to be specified in terms of complex first-order logic expressions, each of which is associated with a bias and priority parameter. In addition, the present invention develops a set of system configurations that meet these test goals, while also satisfying all of the constraints in the configuration model. Example expressions for test goals include if then, iff (if and only if), if and; or; and negate; true; and false.

FIG. 3 illustrates four main steps that are followed by an embodiment of the present invention to generate a system test configuration. Each of these steps will be defined in greater detail in the paragraphs immediately below. The flow starts at step 300 and moves directly to step 301 where solution approach is developed and implemented. Step 301 implements the tool that executes the steps 302, 304, and 306. In step 302, a configuration model is defined. A set of testing goals for the model are specified in step 304. Step 302 and 304 represent the step in which the end user provides inputs to the tool. The tool then automatically generates the test suites for the given input in step 306. The flow ends at step 308. A more detailed explanation is now provided.

Implementing the Solution Approach

One implementation of the present invention is realized by leveraging constraint logic programming (CLP) techniques. With this technique, each requirement and preference expression, as well as each constraint defined in the configuration model, is mapped into a constraint handling rule (CHR). These rules are called requirement, preference, and constraint CHR rules, respectively.

A relatively small system core is then used to compute a minimal test suite by processing these CHR rules. This core itself consists of CHR rules as well as some auxiliary methods (e.g., methods for computing the combined rankings of configurations and methods for sorting sets and lists). There are two kinds of core CHR rules: domain-specific CHR rules and solution-specific CHR rules. Domain-specific CHR rules define the semantics of the basic constructs of the domain of the present invention. These basic constructs include configuration options and their settings, configurations, valid configurations, test suite templates, and test suites. For example, the domain-specific CHR rules for configuration options force each configuration option to take a value only from its discrete set of settings and the CHR rules for valid configurations force that a valid configuration consists of configuration options, each of which is assigned to one of its valid settings such that no inter-option constraint defined in the configuration model is violated.

Solution-specific CHR rules define both the semantics and the scope of the requirement, preference, and constraint CHR rules. For example, these rules enforce constraint and preference CHR rules at the configuration level and the requirement constraints at the test suite level. Solution-specific CHR rules also define the semantics and connectivity of the layers described above.

Modeling Configuration Spaces

According to particular embodiments of the present invention, software configuration spaces are formally modeled using a construct called a "configuration model." A configuration model defines a valid configuration space for the system under test (SUT). A basic building block of this configuration model is "options," which are attributes of the SUT. Each option takes its value from a discrete number of settings. A configuration is then defined as a set of options, each of which is assigned to one of its valid settings. In practice, not all configurations are valid since there may be some inter-option constraints. A valid configuration is one that does not violate any inter-option constraints.

A distinguishing feature of this inventive configuration model is its hierarchical structure, which will be described and shown in detail below. This hierarchical structure is an improvement over the current state of the art techniques that treat configuration spaces as flat spaces with some limited (if any) abstraction mechanisms. The inventive hierarchical configuration model is able to 1) capture the hierarchical nature of software configuration spaces, 2) promote the reuse and sharing of configuration models within/across groups, teams, and organizations, and 3) promote the use of efficient constraint satisfaction mechanisms.

Figure 4:
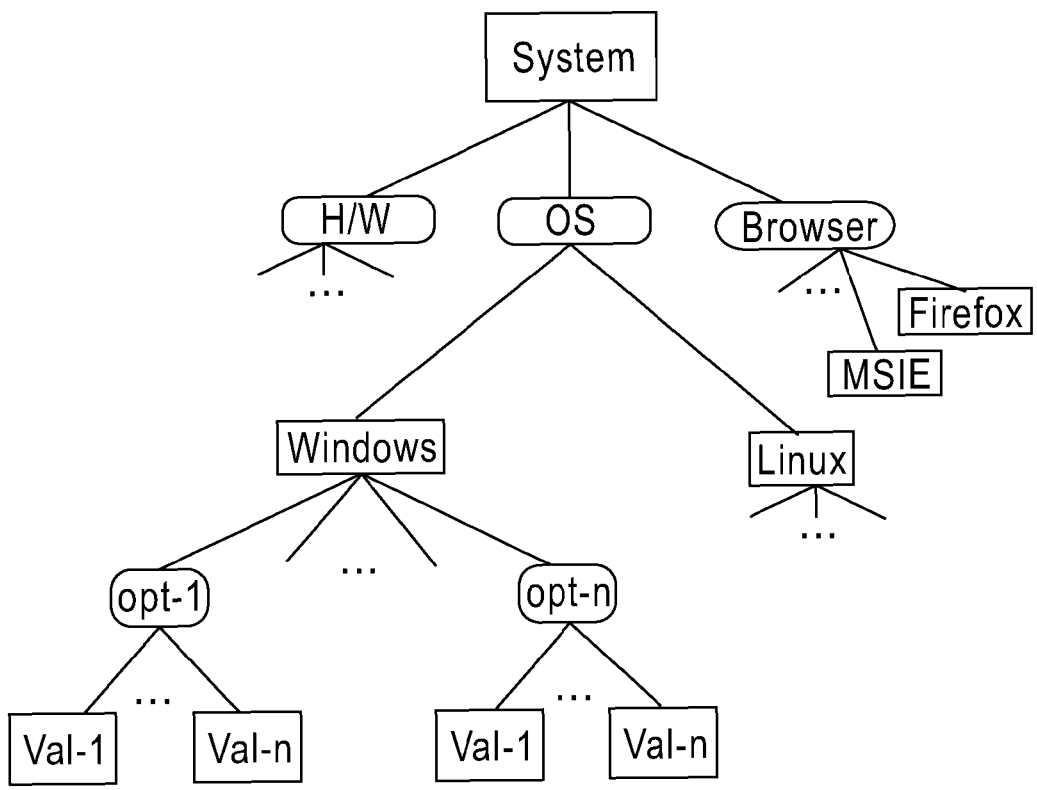
FIG. 4 illustrates a hierarchical configuration model in accordance to an embodiment of the present invention.

FIG. 4 illustrates the hierarchical nature of the present inventive configuration model over an example. The model includes a plurality of nodes, each representing a system property. Two types of nodes exist in the configuration model 400: value and option nodes. Option nodes (ovals) and value nodes (rectangles) represent the configuration options and their settings, respectively. A configuration model tree is valid iff 1) it is a tree, 2) each level of the tree consists of nodes of the same type, 3) the root is a value node, and 4) the tree consists of levels with alternating node types starting from the root.

In the particular example shown in FIG. 4, a system 400 has 3 options: hardware 402, operating system (OS) 404, and browser 406. Each node represents either an abstract or a concrete system property. For instance, defining the node as a browser is abstract, while defining it as Firefox or Internet Explorer is concrete. Each of these options is connected to some value nodes that represent its potential settings. For example, Windows 408 and Linux 410 are two possible settings for the option OS 404. Assuming that OS=Windows, there are several options (i.e., opt-1 . . . opt-n) that can be configured. Each option can be thought of as an attribute and each will have a value. Navigation is performed over the tree using the well-known (.) notation e.g., system.OS. Windows.opt-1=val-1. The rational behind the configuration model is that the setting (value) of an option in a component and/or system could correspond to a subcomponent with a complex configuration model.

In a configuration model, each non-leaf value node is associated with a set of inter-option constraints. A constraint is a first-order logic (FOL) expression. "True" and "false" are supported as default constants. For example, the constraint A=0 and B=0→C=1 means that in a configuration, if A is 0 and B is 0, then C has to be 1.

In a constraint, according to an embodiment of the present invention, each value node can only refer to options and their settings to which it is the parent/ancestor of. The cumulative set of constraints for a value node is the union of all constraints associated with value nodes which the node is the parent/ancestor of. For example, in the system node 400, the following constraint applies: system.os=Linux→system.browser!=MSIE, meaning that if the OS is Linux, the browser cannot be Microsoft Internet Explorer.

With a hierarchical configuration model, the present invention is able to capture the hierarchical nature of software configuration spaces and promote the reuse and sharing of configuration models within and across groups, teams, and organizations. For example, configuration models of sub-components (i.e., suitable sub-trees) can be located at a site that various groups have access to and can be reused, extended, modified, and tailored according to application specific needs. The present invention is also able to promote the use of efficient constraint satisfaction mechanisms e.g., rather than satisfying all the constraints at once, one can consider satisfying only small and relevant portions of the constraints at each level of the tree at a time. In addition, the hierarchical configuration model allows the present invention to prevent name clashes by forcing a hierarchical naming scheme.

Specifying Testing Goals

Testers, according to an embodiment of the present invention, specify the goal of testing in terms of options and their settings. Given a configuration model and a goal specification, the present invention, as shown in step 304 of FIG. 3, is able to compute a minimal test suite of valid configurations that satisfies the goal.

One novel feature of the present invention is that test suites are generated that have configurations with potentially different quantities of options as well as with different sets of options. This is made possible by the hierarchical modeling of the configuration space. Current state-of-the-art techniques can only generate a set of configurations, each of which has exactly the same set of options (e.g., Test Optimizer for Functional Usage and Automated Efficient Test Generator).

After the configuration model is constructed, first-order logic expressions are leveraged to specify one or more testing goals. Two types of goal expressions are used here: requirement and preference expressions. Requirement expressions specify what needs to be tested (i.e., combinations of option settings to be tested). Preference expressions capture the tester's belief (e.g., some combinations are frequently used in the field), knowledge (e.g., some combinations are more expensive to configure compared to others), and experience (e.g., certain combinations do not really matters). Both requirement and preference expressions are associated with a bias and priority parameter, capturing the tester's bias and priority in the testing process, respectively.

A requirement expression is, according to embodiments of the present invention, in the form of true→<a FOL expression>. The left-hand side of a requirement specification is always true, meaning that the requirements must be satisfied with the generated test suite. Unlike the inter-option constraints, requirement expressions are satisfied at the test suite level, not at the configuration level. For example, the requirement expression true→A=0 and B=0 indicates that the tester wants to see at least one configuration where A is 0 and B is 0. Requirements expressions are used to compute the skeleton (template) of the test suite. It should be noted that a graphical user interface (GUI) can be used to flatten out more complex constraints into a set of requirement expressions. For example, a requirement of covering all 2-way (n-way, in general) interactions between k options can be represented as a set of requirement expressions.

A preference expression can be any first-order logic expression. For example, the preference expression OS=Windows and Browser=MSIE→MSIE.opt1=val1 and MSIE.opt2=val2 indicates the tester's intention that if the OS is Windows and browser is MSIE, then it is desirable to configure the MSIE in a certain way. Preference expressions are intended to be satisfied after all the requirement expressions are satisfied, i.e., after the skeleton/template of the test suite is computed. Preference expressions are neither destructive (i.e., they do not modify the settings of already set options) nor constructive (i.e., they do not change the size of the test suite). They are used to assign values to the options that aren't touched by the requirement expressions in a way that reflects the tester's belief (e.g., some combinations are frequently used in the field), knowledge (e.g., some combinations are more expensive to configure compared to others), and experience (e.g., certain combinations do not really matters). The present invention, according to certain embodiments, follows a best-effort approach to satisfy as many preference expressions as possible.

Each requirement, as well as each preference expression, is associated with two parameters: bias ($0 \leq bias \leq 1$) and priority (a positive number). The values of these parameters are assigned by the tester during the creation of the expressions and can later be modified to meet the requirements of evolving testing goals. The bias parameter is used to capture the tester's bias towards satisfying the associated expression. For example, given the preference expression A=0 and B=0→C=1 and D=1 with a bias=0.8, for each configuration in the current test suite template which satisfies the left-hand side of the expression (in this case A=0 and B=0), a biased coin is flipped and the decision whether to satisfy the expression or not is made depending on the outcome. One exception is that requirement expressions are always satisfied at least once, regardless of the bias parameter. Of course, an actual coin is not flipped to make this determination. The reference to coin is for ease of discussion and an actual coin flip can be replaced with many computer algorithms for computing probability.

The priority parameter is used to capture the tester's priorities. This parameter takes a positive number. The larger the number, the higher the priority is. Of course, the invention is not limited to this particular priority number scheme. In other embodiments, the lower number could indicate a higher priority. The actual semantics of this parameter depends on the context. In requirement expressions, priorities impose an order on the set of configurations generated; the generated configurations are ordered in a descending order according to their combined priority rankings (The following section provides a more detailed discussion on how to compute combined priority rankings). In preference expressions, priorities determine the order in which the preference expressions are processed. Preference expressions are ordered in descending order according to their priority rankings and expressions with higher ratings are given priority over the expressions with lower ratings.

Generating Test Suites

Now that a configuration model and a goal specification have been determined, a minimal test suite that satisfies the goal specification can be computed. To this end, embodiments of the present provide a multi-layered approach to reach this goal. A few goals of the inventive multi-layered approach are to: 1) scale the solution to larger, more complex configuration spaces by dividing the goal specification into a set of related sub-goal specifications each of which constitutes a layer, 2) employ the best techniques/strategies at each layer to satisfy the associated set of sub-goals, and 3) allow the solution approach to be tailored towards application/organization-specific needs.

One embodiment of the present invention includes four layers, layers 1, 2, 3, and 4. Layers 1, 2, 3, and 4 deal with the requirement expressions, preference expressions, partial configurations, and priorities, respectively.

Layer 1:

Layer 1 is concerned with the requirement expressions. In this layer, the requirement expressions are taken as inputs and a minimal test suite template is computed that satisfies all the requirement expressions as long as they are not conflicting with the constraints given in the configuration model. A test suite template consists of a set of partially filled configurations.

Figure 5:
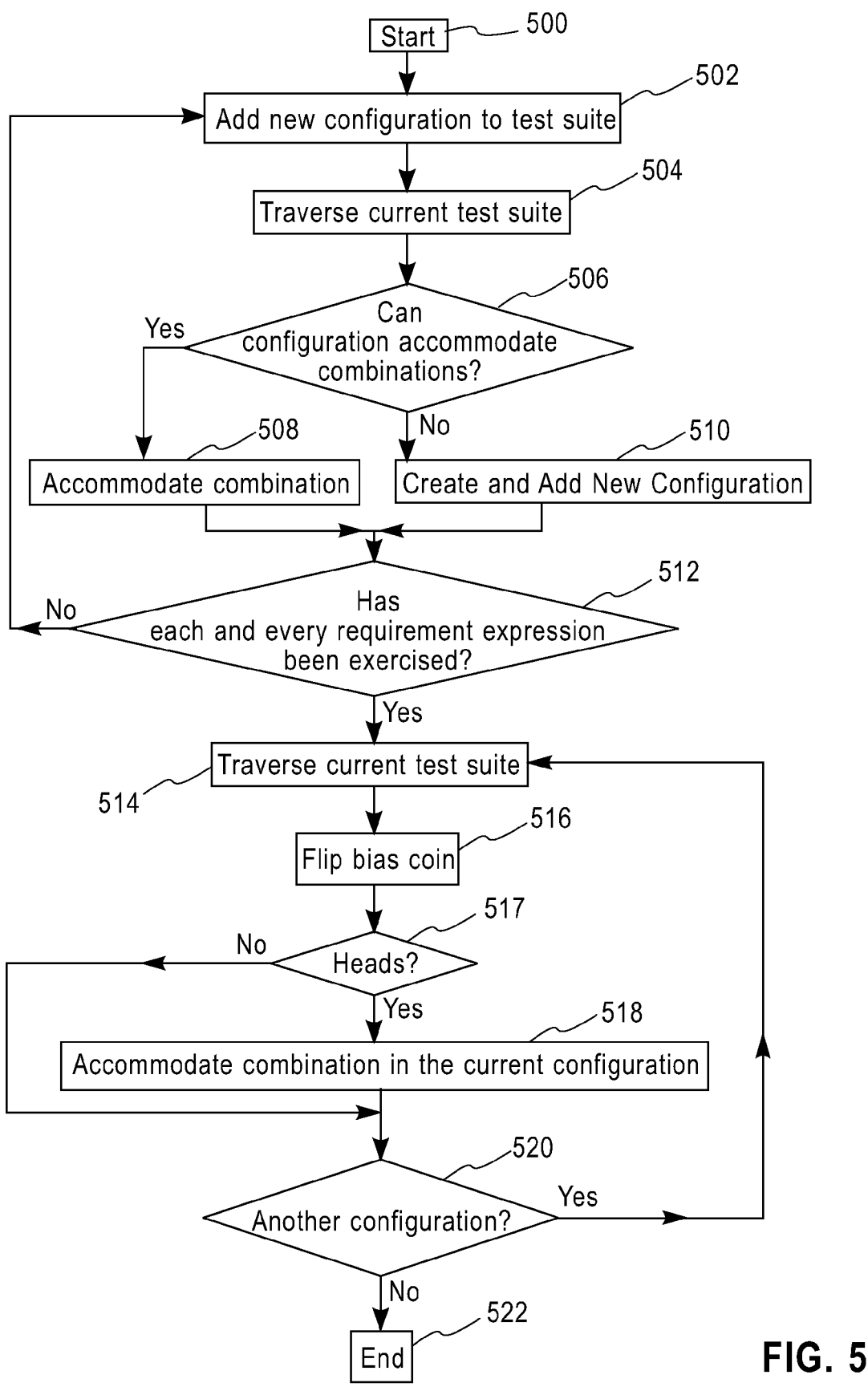
FIG. 5 shows a test suite computation process of Layer 1 in accordance to an embodiment of the present invention.

FIG. 5 shows the Layer 1 test suite computation process according to an embodiment of the present invention. The flow begins at step 500 and moves directly to step 502, where a new configuration is added to an empty test suite, by employing what can be referred to as a "greedy" approach. That is, a requirement expression is randomly picked from a given set of requirement expressions. In one embodiment, a random selection-without-replacement approach is followed here, i.e., each expression is selected only once. Next, step 504, the current test suite is traversed starting from the top to find a configuration that can accommodate the combination of option settings indicated by the requirement expression chosen in step 502. A configuration can accommodate a combination of option settings iff 1) the combination does not conflict with the current settings of the options present in the configuration and 2) the new configuration obtained after accommodating the combination does not conflict with the constraints given in the configuration model.

In step 506 a determination is made as to whether the configuration can accommodate such combinations. If such a configuration is found, step 508, then the combination is accommodated in the configuration. Otherwise, step 510 a new configuration which contains only the required combination is created and added to the suite. The determination is then made in step 512 as to whether or not each and every requirement expression has been exercised. Example expressions for test goals include if then, iff (if and only if), if and; or; and negate; true; and false. If the answer is no, the flow returns to step 502 where another requirement expression is randomly picked from the remaining set of requirement expressions. If all requirement expressions have been satisfied at least once, the flow moves to step 514 where the biases are handled.

Starting at step 514, the current test suite template is traversed. For each configuration in the template and for each requirement expression with a bias b that is not conflicting with the currently selected configuration, a biased coin is flipped in step 516. The coin has a probability p(b) of heads. If the outcome is heads, the combination indicated by the requirement expression is accommodated in the current configuration in step 518. At layer 1, the test suite contains only partially filled configurations. That is, each configuration in the suite may have some options whose values have not been set yet. The term "accommodating a combination in a configuration," means setting the options of the configuration which have not been set yet with the values indicated in the combination. Note that each requirement/preference expression indicates a combination. For example, the expression "true→A=0 and B=1" indicates that the tester wants to see the combination A=0 and B=1 in the test suite. In step 520 a determination is made as to whether there is another configuration in the template that has not been checked. If there is another configuration, the flow returns to step 514 with the next configuration in the template. If in step 517, it is determined that the outcome is tails, the flow also moves to step 520. If there are no other configurations, the flow moves to step 522 and ends.

Figure 6:
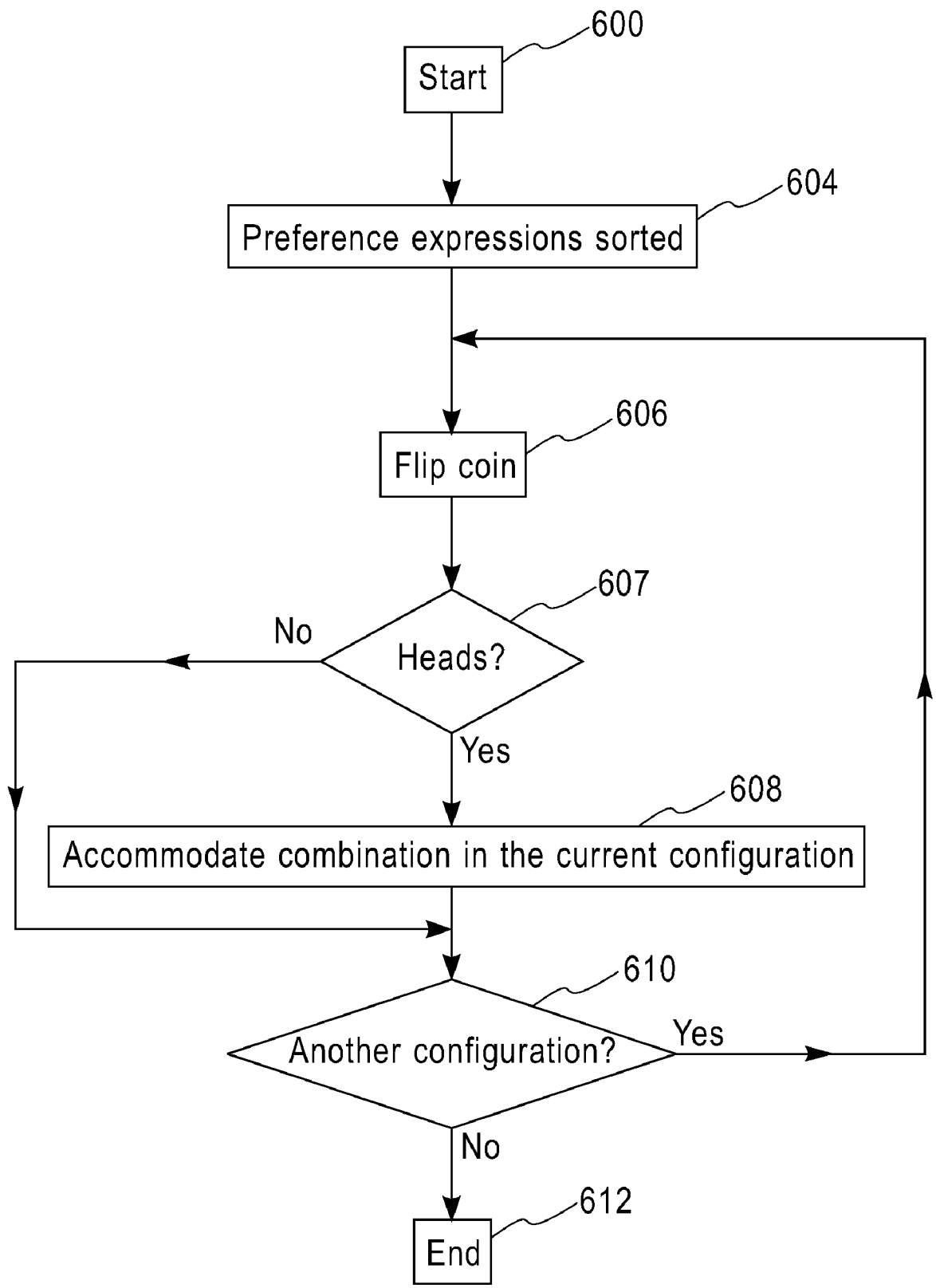
FIG. 6 shows a preference expression process of Layer 2 in accordance with an embodiment of the present invention.

Layer 2:

Layer 2 is concerned with the preference expressions. The process flow of layer 2 is shown in FIG. 6. The flow begins at step 600 and moves directly to step 602, where the preference expressions are sorted in descending order according to their priority rankings. Preference expressions with higher rankings are given priority over the preferences with lower rankings. Starting with the highest priority preference expression, all configurations in the current test suite template that satisfy the left-hand side of the expression and that do not conflict with the preference expression are found in step 604. The sample preference expression A=0 and B=0→C=1 and D=1 with a bias b can be used to explain this layer. In this expression, A=0 and B=0 constitute the left-hand side (lhs) of the expression and C=1 and D=1 constitute the right-hand side (rhs) of the expression.

For each such configuration, a biased coin with probability p(b) of heads is flipped in step 606. The expression is satisfied depending on the outcome of step 606. If the outcome is heads, the combination is accommodated in step 608; otherwise the combination is not accommodated and the flow moves to step 610 to determine if there is a change in the test suite template. If there is a change, the flow moves back up to step 605, where the current test suite is traversed. Otherwise, the flow moves to step 612 and ends.

Layer 3:

Layer 3 is concerned with partial configurations. As described above, the result of Layer 2 is a test suite template that satisfies the requirement expressions and as many preference expressions as possible. In this template, it is possible to have configurations with some configuration options that are not yet set. This can be the case when requirement and preference expressions are concerned with only a portion of the options. In Layer 3, the test suite template is converted to a concrete test suite by assigning values to untouched options in such a way that no configuration in the resulting suite conflicts with the constraints defined in the configuration model.

Layer 4:

Layer 4 is concerned with the priorities of the requirement expressions. Layer 3 emits a test suite and Layer 4 reorders this suite according to the combined priority ranking of each configuration. As discussed above, each requirement expression is associated with a positive priority value. Each configuration in the resulting test suite can potentially accommodate more than one such combination. Therefore, a combined priority ranking is computed for a configuration using the rankings of combinations covered by the configuration. The exact formula to do this is given by the tester. One exemplary way to compute the combined priority ranking for a configuration is to multiply all the priorities of combinations accommodated by the configuration. The configurations are then reordered in descending order according to the combined priority rankings.

Generalized Architecture for a Computer System

Figure 7:
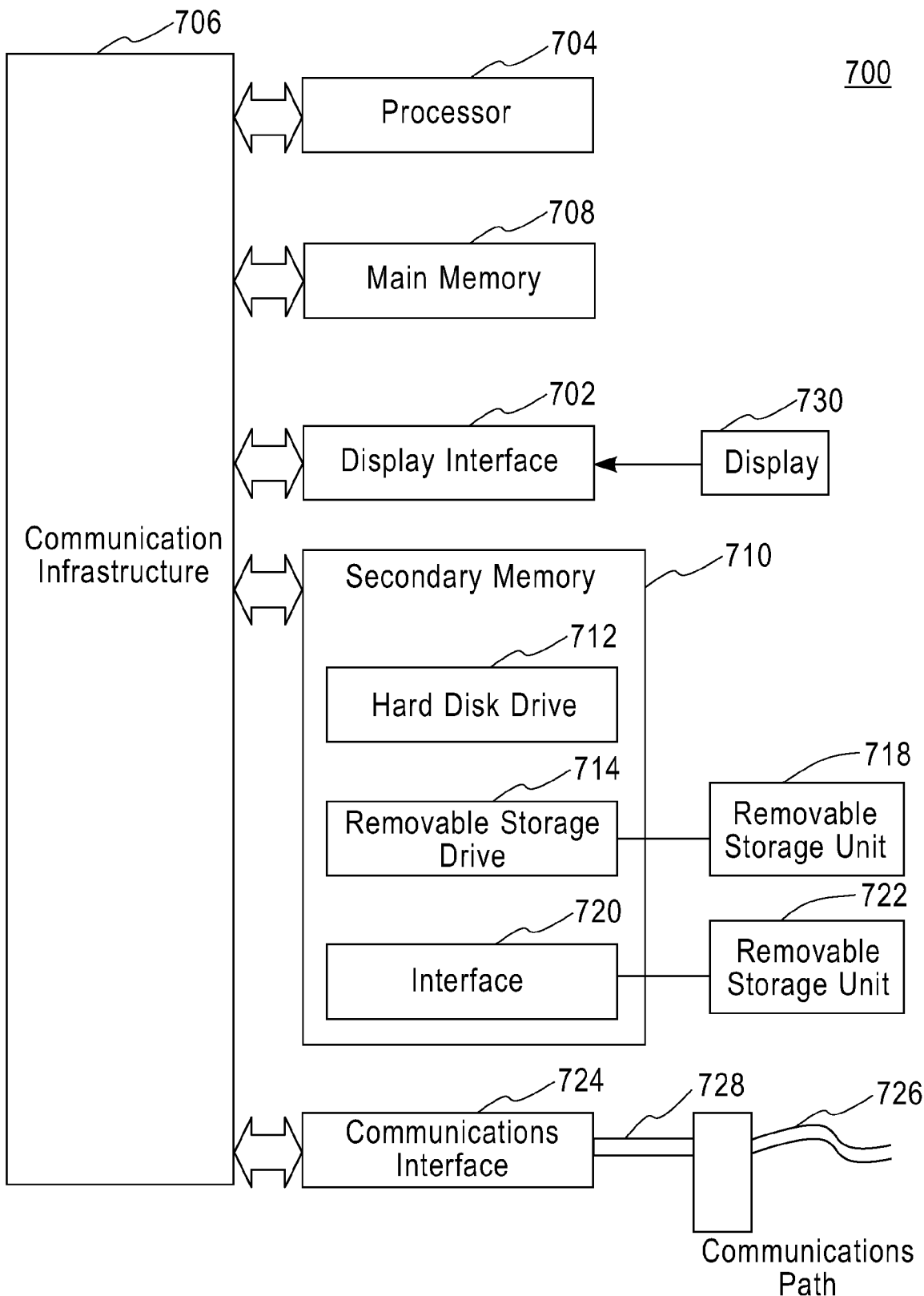
FIG. 7 is a block diagram of an exemplary computer system useful for implementing the present invention.

FIG. 7 is a block diagram of a computer system useful for implementing an embodiment of the present invention. The computer system includes one or more processors, such as processor 704. The processor 704 is connected to a communication infrastructure 702 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 708 that forwards graphics, text, and other data from the communication infrastructure 702 (or from a frame buffer not shown) for display on the display unit 710. The computer system also includes a main memory 706, preferably random access memory (RAM), and may also include a secondary memory 712. The secondary memory 712 may include, for example, a hard disk drive 714 and/or a removable storage drive 716, representing a floppy disk drive, a magnetic tape drive, an optical disk drive, etc. Removable storage drive 716, reads and writes to a floppy disk, magnetic tape, optical disk, etc., storing computer software and/or data. The system also includes a resource table 718, for managing resources $R_1$-$R_n$ such as disk drives, disk arrays, tape drives, CPUs, memory, wired and wireless communication interfaces, displays and display interfaces, including all resources shown in FIG. 7, as well as others not shown.

In alternative embodiments, the secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system.

The computer system may also include a communications interface 724. Communications interface 724 acts as both an input and an output and allows software and data to be transferred between the computer system and external devices. Examples of communications interface 724 may include a modem, a network interface (such as an Ethernet card), a communications port, a PCMCIA slot and card, etc. Software and data transferred via communications interface 724 are in the form of signals which may be, for example, electronic, electromagnetic, optical, or other signals capable of being received by communications interface 724. These signals are provided to communications interface 724 via a communications path (i.e., channel) 726. This channel 726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 706 and secondary memory 712, removable storage drive 716, a hard disk installed in hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 706 and/or secondary memory 712. Computer programs may also be received via communications interface 724. Such computer programs, when executed, enable the computer system to perform the features of the present invention as discussed herein. In particular, the computer programs, when executed, enable the processor 704 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method of creating a system configuration data set, the method comprising:

creating a hierarchical tree structure with a plurality of nodes where each node represents a system property and includes at least one of an attribute and a value;

receiving a set of expressions representing a set of system test goals, wherein the set of expressions includes at least one preference expression that defines at least one of testing knowledge, testing experience, and testing beliefs;

creating a set of system test data utilizing the hierarchical tree structure combined with the expressions;

receiving at least one bias value and at least preference value;

associating the at least one bias value with the at least one preference expression; and associating the at least one priority value to the at least one preference value.

2. The method according to claim 1, wherein an expression includes at least one of:

if then;
iff;
if and;
or;
and negate;
true; and
false.

3. The method according to claim 1, wherein the expressions are first-order logic expressions that define conditional and quantified goals of a system.

4. The method according to claim 1, further comprising:

selecting at least one of the attribute, the value, and the expression so as to further define at least one of the set of system test goals.

5. The method according to claim 1, wherein the set of expressions includes at least one preference expression that defines at least one of testing knowledge, testing experience, and testing beliefs.

6. The method according to claim 1, further comprising:
   associating a bias value to the at least one preference expression; and
   associating a priority value to the at least one preference expression.

7. The method according to claim 1, wherein the system property is one of abstract and concrete.

8. A method of creating a system configuration data set, the method comprising:
   creating a hierarchical tree structure with a plurality of nodes where each node represents a system property and includes at least one of an attribute and a value of the system property, wherein at least a set of nodes in the plurality of nodes are at on a first level of the hierarchical tree structure, wherein each node in the set of nodes represent at least one of hardware and software components of a system, and wherein each node in the set of nodes comprises a set of child nodes on a second level of the hierarchical tree structure, wherein each child node comprises the at least one of the attribute and the value of the system property of the system;
   receiving a set of logical expressions representing a set of system test goals; and
   creating a set of system test data based on the hierarchical tree structure combined with the set of logical expressions.

* * * * *